(12) United States Patent
Laible

(10) Patent No.: US 11,125,347 B1
(45) Date of Patent: Sep. 21, 2021

(54) OVERMOLDED VALVE FOR A LIQUID CONTAINER

(71) Applicant: Rodney Laible, Omaha, NE (US)

(72) Inventor: Rodney Laible, Omaha, NE (US)

( * ) Notice: Subject to any disclaimer, the term of this patent is extended or adjusted under 35 U.S.C. 154(b) by 0 days.

(21) Appl. No.: 17/217,267

(22) Filed: Mar. 30, 2021

(51) Int. Cl.
*F16K 15/02* (2006.01)
*B67D 3/00* (2006.01)

(52) U.S. Cl.
CPC .......... *F16K 15/025* (2013.01); *B67D 3/0025* (2013.01)

(58) Field of Classification Search
CPC ...... F16K 15/025; F16K 35/04; F16K 35/026; F16K 35/50; F16K 15/18; F16K 15/028; B67D 3/0025
See application file for complete search history.

(56) References Cited

U.S. PATENT DOCUMENTS

| | | | |
|---|---|---|---|
| 5,010,916 A * | 4/1991 | Albrecht | F16K 15/028 137/454.2 |
| 6,945,432 B2 | 9/2005 | Laible | |
| 6,945,433 B2 | 9/2005 | Laible | |
| 6,986,443 B2 | 1/2006 | Laible | |
| 7,832,599 B2 | 11/2010 | Laible | |
| 7,841,492 B2 | 11/2010 | Laible | |
| 8,066,157 B2 | 11/2011 | Laible | |
| 8,220,665 B2 | 7/2012 | Laible | |
| 8,671,976 B2 * | 3/2014 | Park | F04B 27/1018 137/543.19 |
| 10,618,710 B1 | 4/2020 | Laible | |
| 10,899,508 B1 | 1/2021 | Laible | |
| 2003/0196703 A1 * | 10/2003 | DeCler | F16K 15/18 137/538 |
| 2017/0292620 A1 * | 10/2017 | Dennis | F16K 15/028 |

* cited by examiner

*Primary Examiner* — P. Macade Nichols
(74) *Attorney, Agent, or Firm* — Dennis L. Thomte; Thomte Patent Law Office LLC

(57) ABSTRACT

An overmolded valve is provided for use in a container having a throat. The valve is inserted into the throat of the container and prevents liquid from flowing from the container during shipment or storage. When the container is inverted for use with a dosing and/or dispensing apparatus, the valve remains closed until it is opened by an upward force to permit liquid to flow from the container, by gravity, to the dosing and/or dispensing apparatus. The valve closes when the upward force is removed. A pair of plastic semi-helical springs urge the valve to the closed position.

13 Claims, 8 Drawing Sheets

OVERMOLDED VALVE FOR A LIQUID CONTAINER

BACKGROUND OF THE INVENTION

Field of the Invention

This invention relates to an overmolded valve which is inserted into the throat of a liquid container. More particularly, this invention relates to an overmolded valve which is inserted into the throat of a liquid container while the liquid container is in an upright position to prevent liquid from leaking from the container during transport and storage of the container. Even more particularly, this invention relates to an overmolded valve which may be opened to permit liquid to flow from the container by gravity when the container is inverted. Even more particularly, this invention relates to an overmolded valve which includes a pair of semi-helical plastic springs which yieldably urge the valve to its closed position.

Description of the Related Art

Applicant has received several patents relating to dosing and/or dispensing systems, such as U.S. Pat. Nos. 6,945,432; 6,945,433; 6,986,433; 7,832,598; 7,841,492; 8,066,157; 8,220,665; 10,618,710 and 10,899,508, the disclosures of which are incorporated herein by reference thereto to complete this disclosure if necessary.

In most of the above patents, a throat plug assembly, including a normally closed valve, is inserted into the throat of the container to prevent liquid from flowing from the container when the container was shipped or stored. Many of the above patents permitted liquid to flow from the container by gravity when the container was inverted, and the valve was opened. The throat plug assemblies of Applicant's patents set forth above performed in an excellent manner and were commercially successful. Applicant has developed a unique overmolded valve which is completely comprised of recyclable plastic and which is less expensive to manufacture and easier to assemble. Other features of the instant invention will be set forth in detail hereinafter.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A normally closed overmolded valve is provided for use in the throat of a liquid container. When the container is being shipped or stored, the valve of this invention prevents liquid from leaking from the container. When the container is inverted for use with a dispensing and/or dosing apparatus, the normally closed valve, upon being subjected to an upward force, opens to permit liquid to flow, by gravity, downwardly therethrough.

The valve of this invention will be described as being in an inverted position when the liquid container is in an inverted position. The valve of this invention includes a plastic substrate member having upper and lower ends. The plastic substrate member includes a vertically disposed and ring-shaped wall member, having an inner side, an outer side, an upper end and a lower end, at the lower end thereof which defines a liquid discharge opening. A horizontally disposed and ring-shaped first lip extends outwardly from the lower end of the wall member. A horizontally disposed and ring-shaped second lip extends outwardly from the wall member above the first lip. The first lip, the wall member and the second lip are overmolded with a plastic material.

A plurality of radially spaced-apart and vertically disposed and elongated plastic supports, having upper and lower ends, extend upwardly from the upper end of the wall member. A horizontally disposed ring member is mounted on the upper ends of the supports. The inner side of the ring member has a plurality of radially spaced-apart retainers extending inwardly therefrom.

The valve of this invention also includes a plastic valve member, having upper and lower ends, which is vertically movably positioned in the interior of the substrate member. The valve member includes a disc-shaped valve plate at the lower end thereof. A plurality of radially spaced-apart posts extends upwardly from the periphery of the valve plate. A horizontally disposed lower ring member is mounted on the upper ends of the posts. A pair of semi-helical plastic springs, having upper and lower ends, extend upwardly from the lower ring member in an opposite manner. A horizontally disposed upper ring member is secured to the upper ends of the plastic springs.

The valve member is inserted downwardly into the upper end of the substrate member until the upper ring member thereof is positioned below the retainers on the inner side of the ring member with the retainers preventing upward movement of the valve member with respect to the substrate member.

When the container is inverted, the plastic springs maintain the valve plate in a closed position with respect to the liquid discharge opening of the substrate member. When an upward force is applied to the valve plate, the valve plate moves upward against the force of the plastic springs to open the liquid discharge opening so that liquid may flow downwardly, by gravity, through the liquid discharge opening to a dosing apparatus, or dispensing apparatus, or some other equipment. The valve of this invention is comprised completely of a plastic recyclable material.

A principal object of the invention is to provide an overmolded valve for a liquid container.

A further object of the invention is to provide an overmolded valve for a liquid container which is sustainable in use.

A further object of the invention is to provide an overmolded valve for a liquid container with the valve member and the substrate member thereof being comprised entirely of recyclable plastic material.

A further object of the invention is to provide a device of the type described which utilizes less components than other valves in the art.

A further object of the invention is to provide an overmolded valve for a liquid container which is less expensive than other inserts in the art.

A further object of the invention is to provide an overmolded valve for a liquid container which is easier to manufacture and assemble than other inserts in the art.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 10:
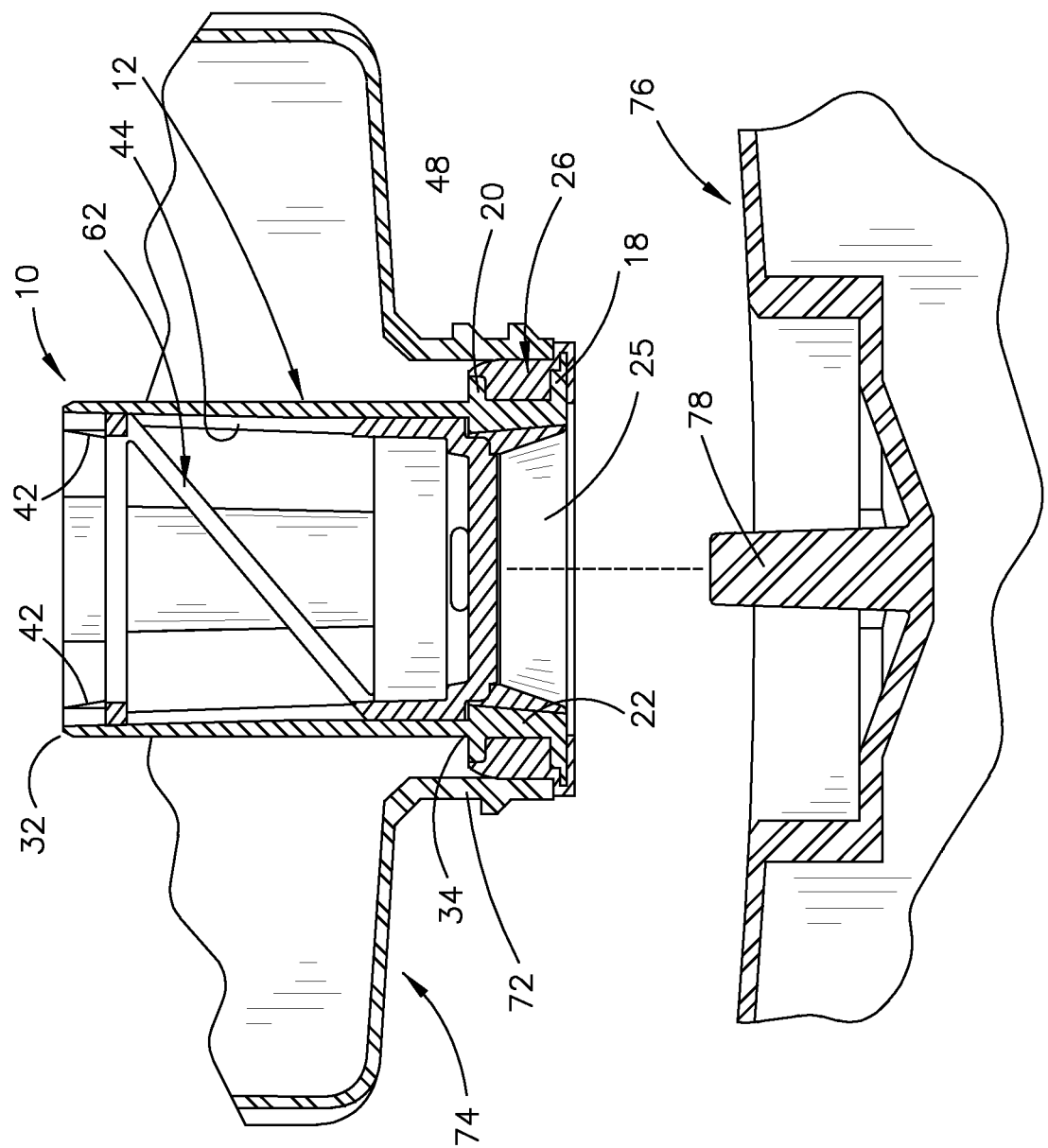
FIG. 10 is a sectional view illustrating the valve of this invention mounted in the throat of a liquid container with the valve being in a closed position.
Figure 11:
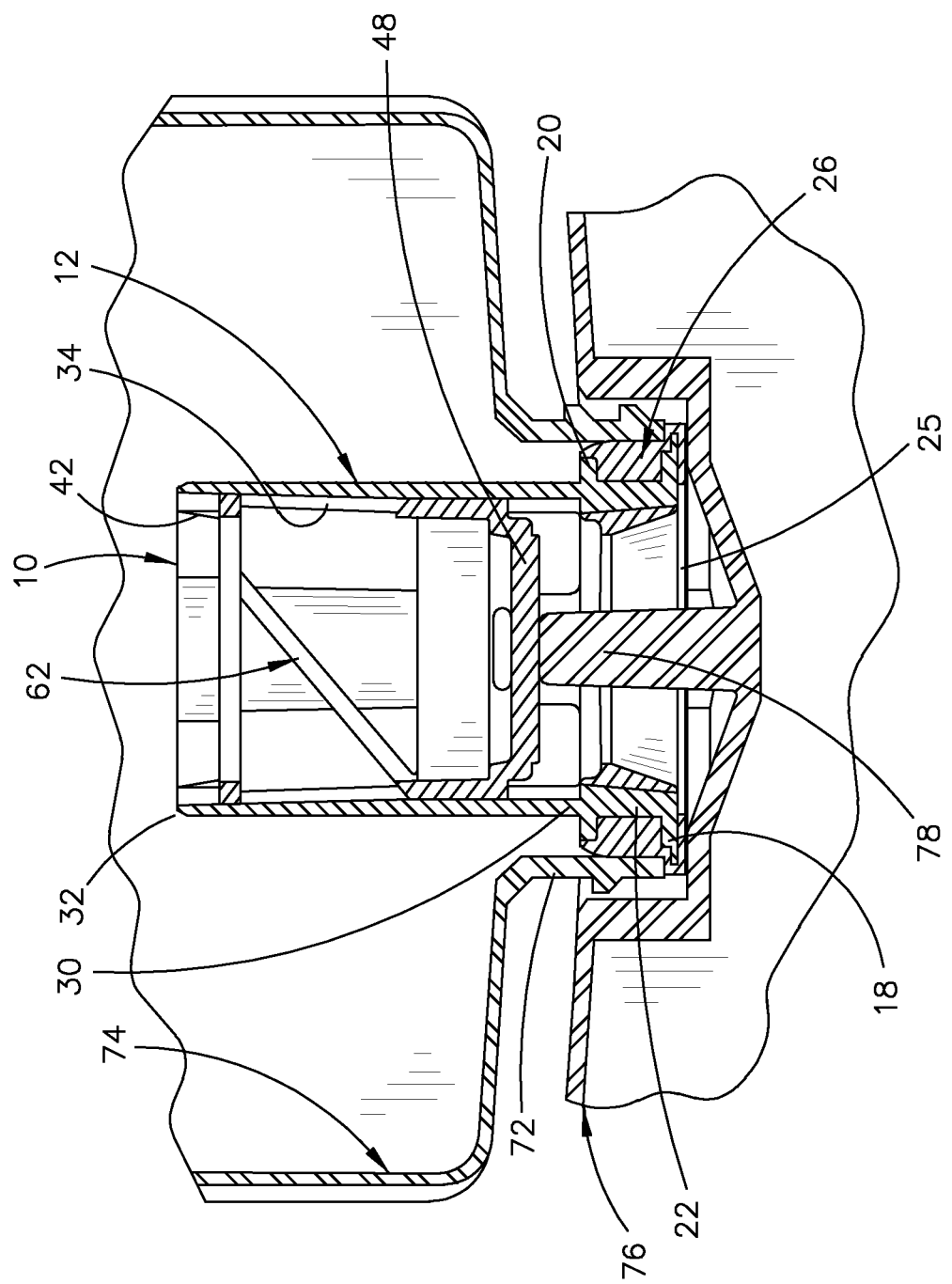
FIG. 11 is a sectional view similar to FIG. 10 except that the valve has been moved to an open position by an actuator.

The valve of this invention is referred to with the reference numeral 10. Valve 10 is designed to be used in the throat of a liquid container such as shown and described in U.S. Pat. Nos. 7,832,598; 8,066,157; 8,220,665; 10,618,710 and 10,899,508, the disclosures of which are incorporated herein by reference thereto to complete this disclosure if necessary. The valve 10 will be shown in the inverted position as it would appear when the liquid container is in the gravity flow inverted position as seen in FIGS. 10 and 11.

Valve 10 includes a plastic substrate member 12 having an upper end 14 and a lower end 16. As will be described hereinafter, valve 10 also includes a valve member 46 as will be described hereinafter. Substrate member 12 includes an annular lip 18 which extends outwardly from the lower end 16 thereof. Substrate member 12 also includes an annular lip 20 which extends outwardly from the upper end of cylindrical wall 22. The upper end of wall 22 defines a shoulder 24 and a liquid discharge opening 25. The numeral 26 refers to overmolding plastic which extends over and around lip 18 and lip 20. The overmolding plastic 26 also extends around the inner and outer sides of wall 22.

Substrate member 12 has four identical support legs 28 which extend upwardly from shoulder 24 in a spaced-apart manner. Each of the support legs 28 has a lower end 30, an upper end 32, an inner side 34 and an outer side 36. The lower ends 30 of the support legs 28 are joined to lip 24 and wall 22. A ring 40 is molded with the support legs 28 at the upper ends thereof. The inner side of ring 40 has four horizontally disposed arcuate retainers 42 which extend inwardly therefrom in a spaced-apart manner between the support legs 28. Each of the support legs 28 has a vertically disposed and elongated spacer 44 at the inner side 34 thereof.

Valve 10 includes a valve member 46 which is snap-fitted into the interior of substrate member 12. Valve member 46 includes a disc-shaped plate 48 at its lower end 50. A plurality of short posts 52 extend upwardly from the periphery of plate 48 in a spaced-apart manner. A flat and horizontally disposed ring 54 is molded with the posts 52 and is positioned at the upper ends of the posts 52.

Figure 1:
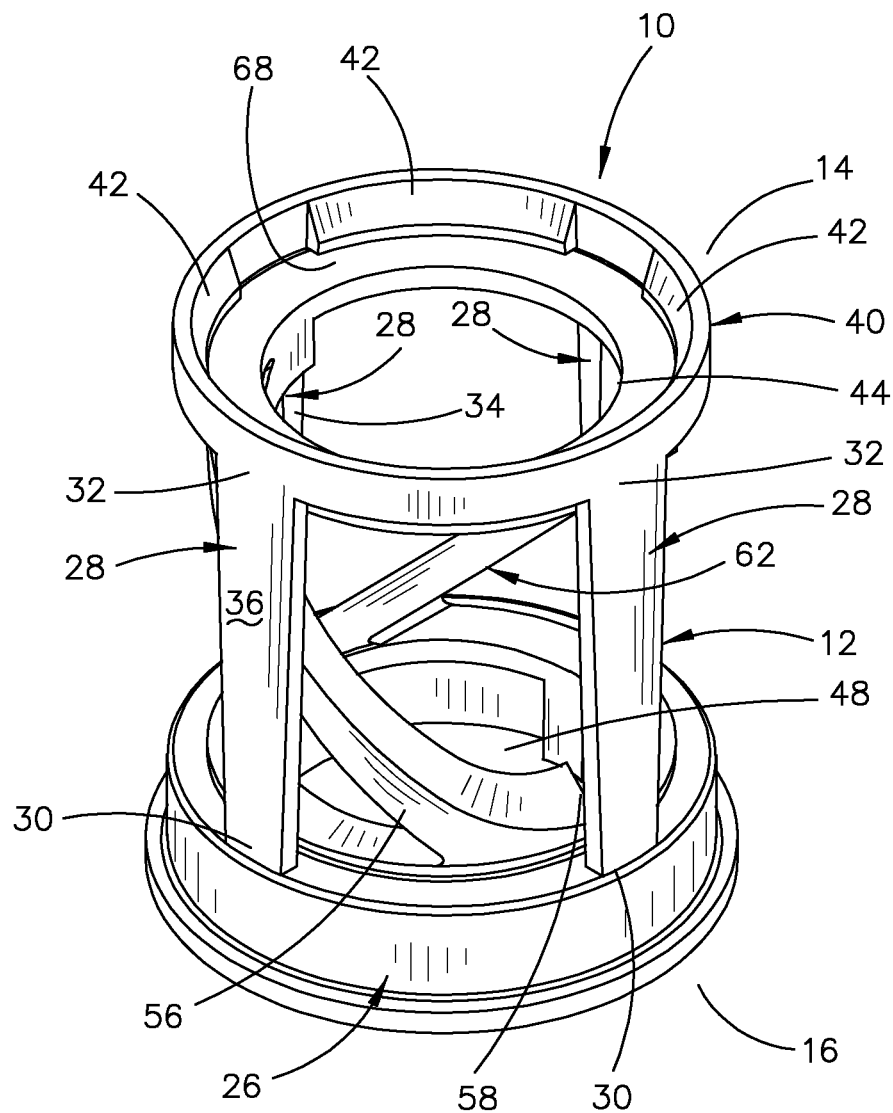
FIG. 1 is a perspective view of the valve of this container.
Figure 2:
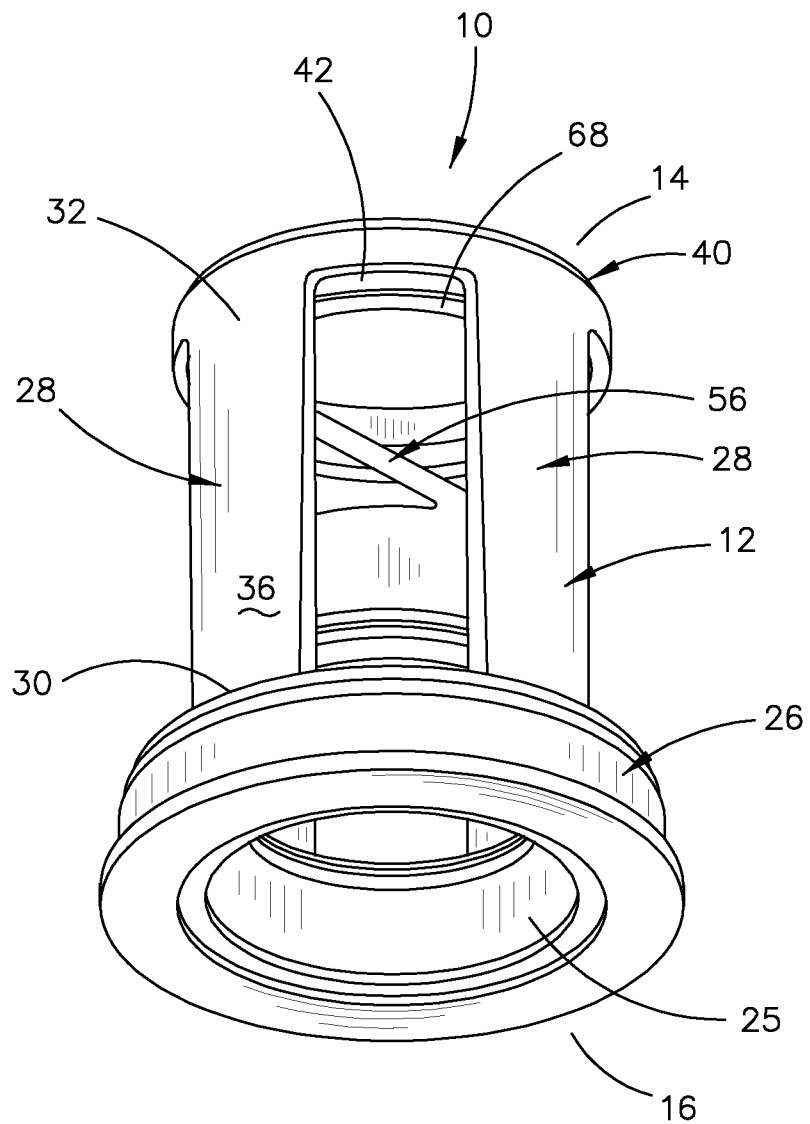
FIG. 2 is a lower perspective view of the valve of this invention.
Figure 3:
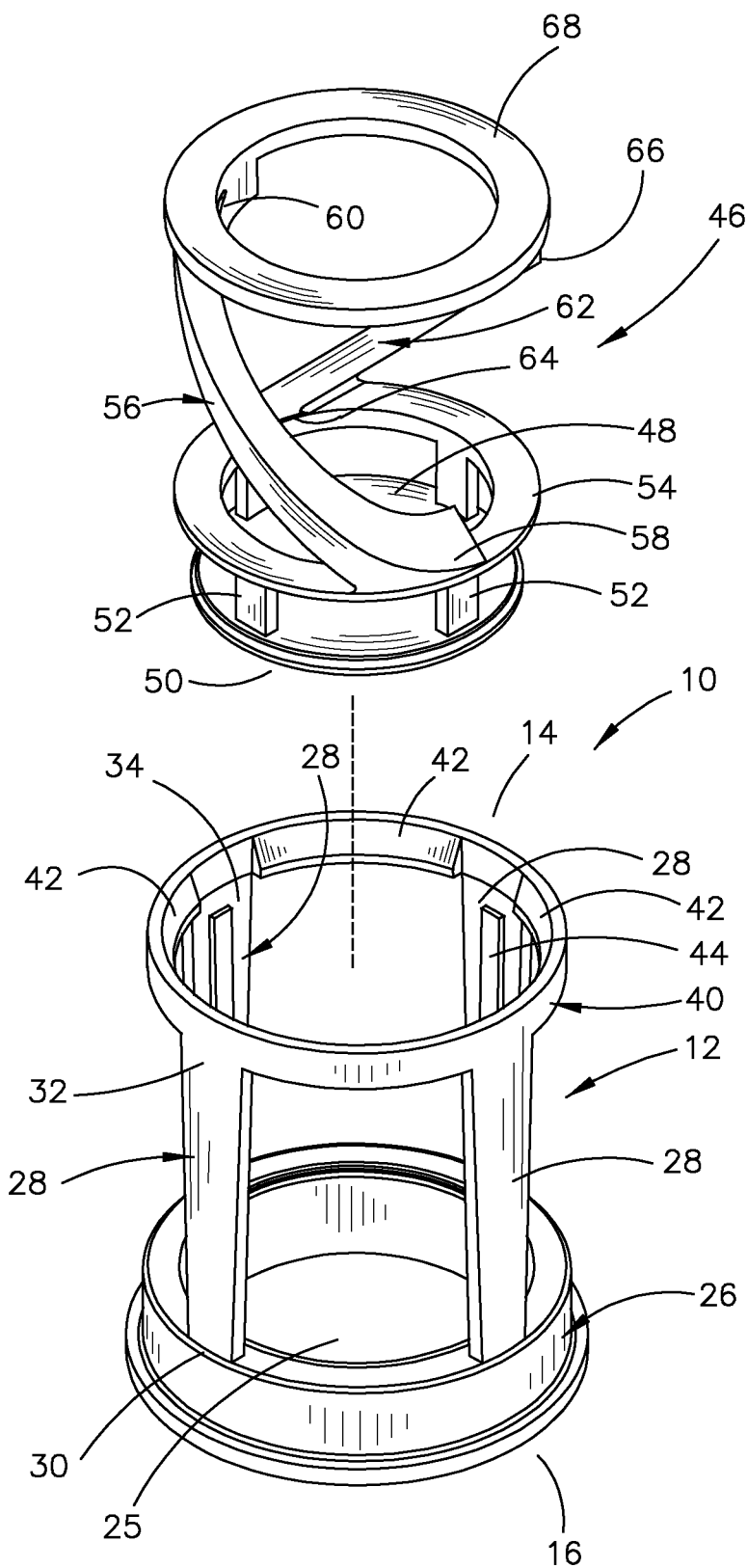
FIG. 3 is an exploded perspective view of the valve of this invention.
Figure 4:
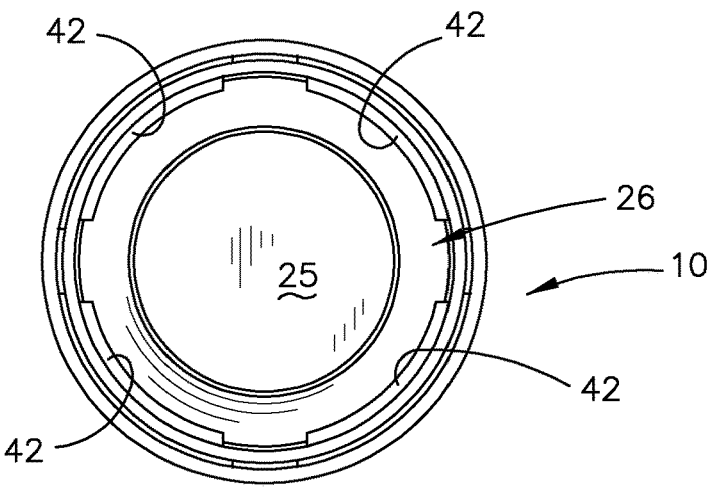
FIG. 4 is a top view of the valve of this invention.
Figure 5:
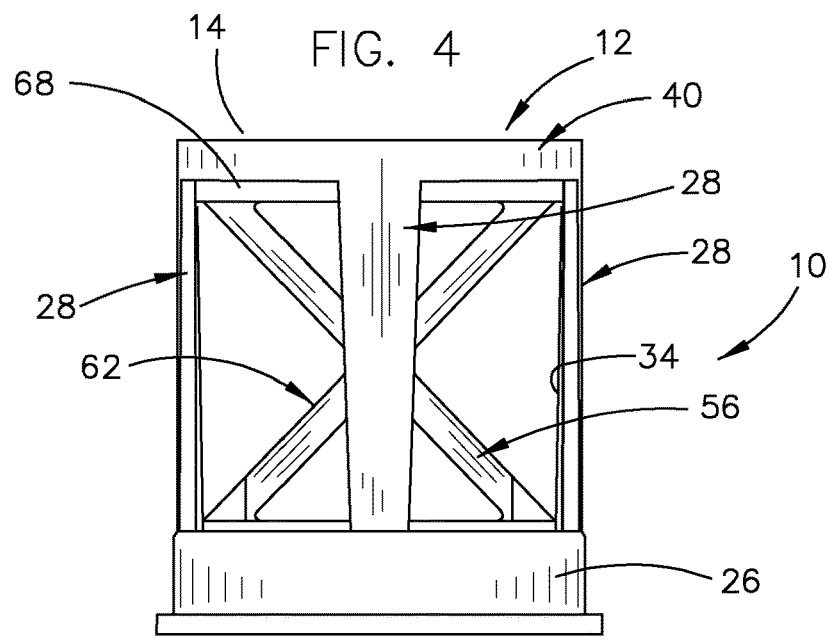
FIG. 5 is a side view of the valve of this invention.
Figure 6:
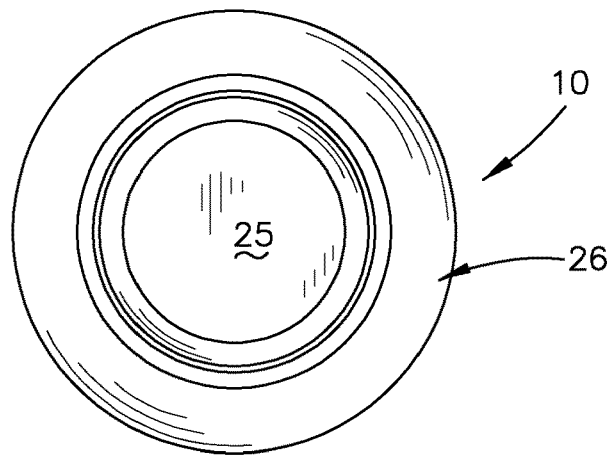
FIG. 6 is a bottom view of the valve of this invention.
Figure 8:
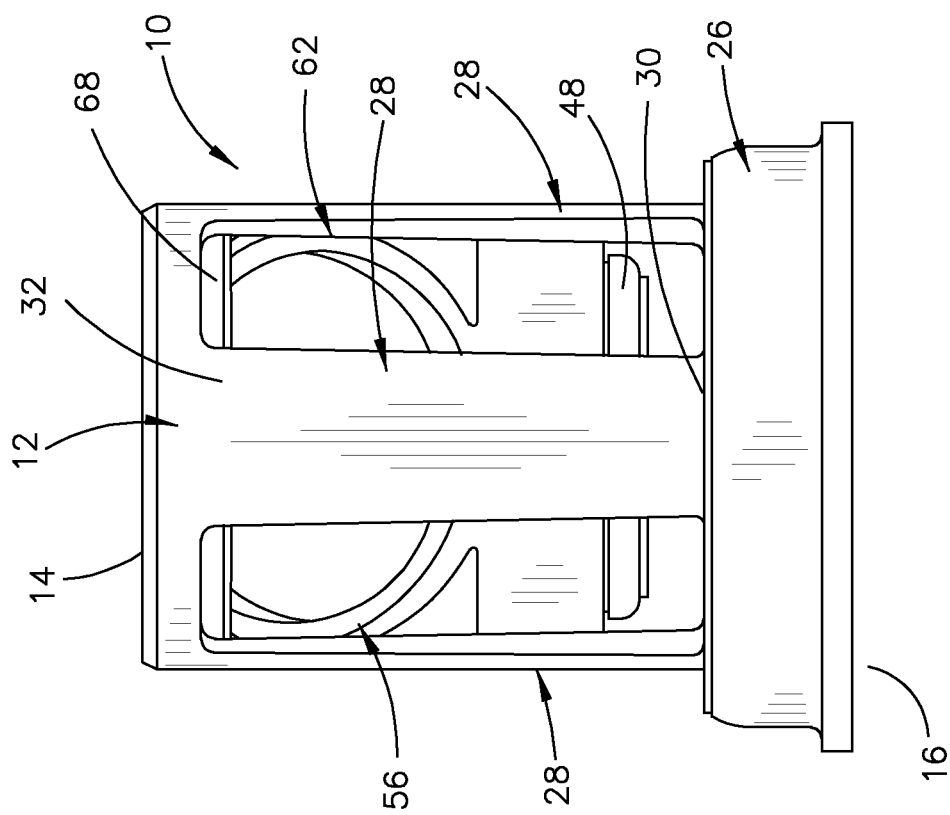
FIG. 8 is a side view of the valve of this invention.
Figure 7:
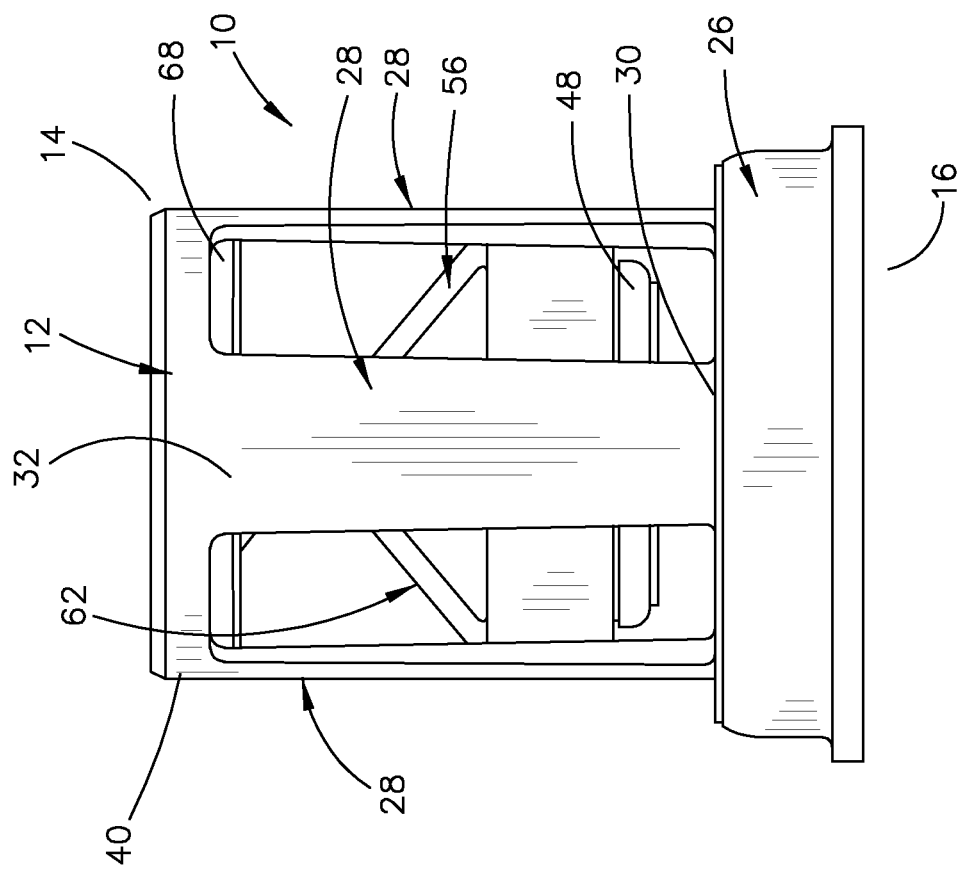
FIG. 7 is a side view of the valve of this invention.
Figure 9:
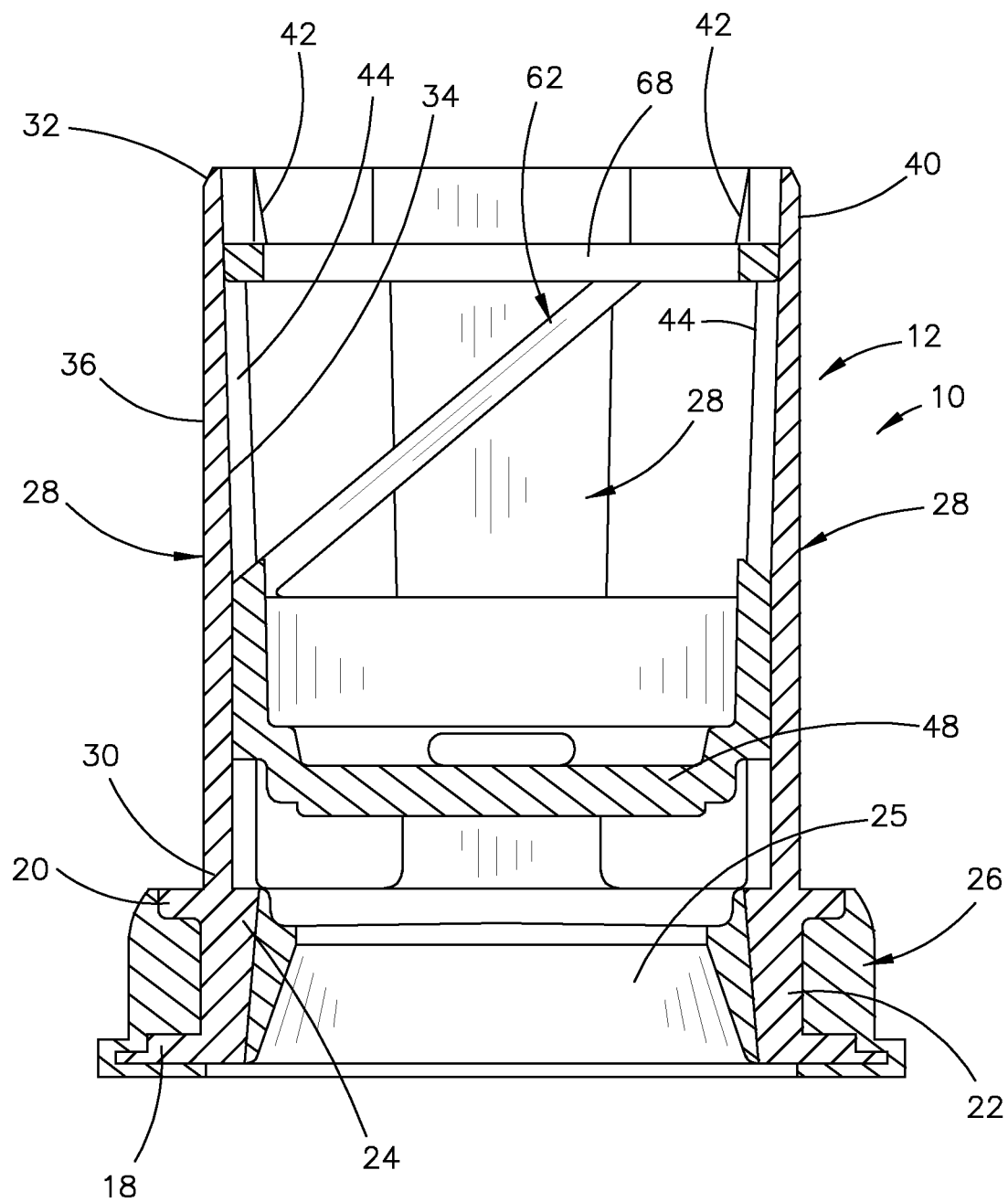
FIG. 9 is a sectional view of the valve of this invention.

Valve member 46 includes a semi-helical plastic spring 56 having a lower end 58 and an upper end 60. The lower end 58 of spring 56 is molded to ring 54. Valve member 46 also includes a semi-helical plastic spring 62 having a lower end 64 and an upper end 66. The lower end 64 of spring 62 is molded to ring 54. The lower ends 58 and 64 of springs 56 and 62 respectively are spaced-apart 180 degrees. The upper ends 60 and 66 of springs 56 and 62 respectively are spaced-apart 180 degrees. A horizontally disposed ring 68 is molded to the upper ends 60 and 66 of springs 56 and 62 respectively. Valve member 46 is inserted downwardly into substrate member 12 until the plate 48 engages the ring 24 thereby closing discharge opening 25. Downward force is then applied to ring 68, against the resistance of springs 56 and 62, until the upper side 70 of ring 68 is positioned below the lower ends of the retainers 42 as seen in FIG. 9. When so positioned, the retainers 42 prevent upward movement of the ring 68 to maintain the springs 56 and 62 in compression.

The valve 10 is then inserted downwardly into the throat 72 of container 74 which is in the upright position. The valve 10 is moved downwardly into the throat 72 of container 74 until lip 20 engages the upper end of throat 72 of container 74. A cap, not shown, will normally be threaded onto the throat 72. The valve 10 prevents liquid from leaking from the container 74 during shipment or storage.

When it is desired to dose or dispense liquid from the container 44, the cap is removed from the throat 72 and the container 74 is inverted onto a dosing or dispensing apparatus 76. When it is desired to dispense liquid from the container 74, upward force is applied to the plate 48 by an actuator 78 thereby opening the opening 26. Upward force may also be applied to plate 48 by some sort of actuator such as shown in Applicant's patents. The semi-helical springs 56 and 62 will move the plate 48 to its closed position when the upward force on plate 48 is discontinued.

The valve 10 of this invention has many advantages with respect to the prior art. Those advantages are as follows. The valve 10 is comprised completely of recyclable plastic. The valve 10 requires less plastic to manufacture. The valve 10 is easier to assemble than the prior art devices. The valve 10 is sustainable in use. The valve 10 is less expensive than the prior art devices. The valve 10 utilizes less components than the devices of the prior art since the valve 10 is comprised of two components.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A plastic gravity flow valve for insertion into the throat of an inverted liquid container, comprising:

a generally cylindrical and vertically disposed plastic
substrate member including:
  (a) a lower end and an upper end;
  (b) a vertically disposed and ring-shaped wall member,
    having an inner side, an outer side, an upper end and
    a lower end, at said lower end of said substrate
    member and which defines a liquid discharge open-
    ing;
  (c) a horizontally disposed and ring-shaped first lip
    extending outwardly from said lower end of said
    wall member;
  (d) a horizontally disposed and ring-shaped second lip
    extending outwardly from said wall member above
    said first lip;
  (e) said wall member, said first lip and said second lip
    being overmolded with a plastic material;
  (f) a plurality of vertically disposed and radially
    spaced-apart elongated supports with each of said
    elongated supports having an upper end, a lower end,
    an inner side and an outer side, extending upwardly
    from said upper end of said wall member;
  (g) a first ring member, having inner and outer sides,
    secured to said upper ends of said elongated sup-
    ports; and
  (h) a plurality of radially spaced-apart valve retainers
    secured to said inner side of said first ring member;
a plastic valve member, having upper and lower ends,
  including:
  (a) a horizontally disposed and disc-shaped valve plate
    having a periphery, an upper side and a lower side;
  (b) a plurality of vertically disposed posts, having
    upper and lower ends, extending upwardly from said
    disc-shaped valve plate in a radially spaced-apart
    manner inwardly of said periphery of said disc-
    shaped valve plate;
  (c) a horizontally disposed second ring member secured
    to said upper ends of said vertically disposed posts;
  (d) a first semi-helical plastic spring having a lower end
    and an upper end;
  (e) said lower end of said first semi-helical plastic
    spring being secured to said second ring member;
  (f) a second semi-helical plastic spring having a lower
    end and an upper end;
  (g) said lower end of said second semi-helical plastic
    spring being secured to said second ring member
    opposite to said first semi-helical plastic spring;
  (h) a horizontally disposed third ring member having
    upper and lower sides;
  (i) said upper end of said first semi-helical plastic
    spring being secured to said third ring member;
  (j) said upper end of said second semi-helical plastic
    spring being secured to said third ring member
    opposite to said upper end of said first semi-helical
    plastic spring;
said plastic valve member being vertically movably posi-
  tioned in said plastic substrate member;
said plastic valve member being vertically movable with
  respect to said plastic substrate member between lower
  and upper positions;
said first and second plastic springs yieldably urging said
  plastic valve member to its lower position;
said valve plate closing said liquid discharge opening in
  said substrate member when said plastic valve member
  is in said lower position; and
said valve plate being spaced above said liquid discharge
  opening in said substrate member when in said upper
position to permit liquid to pass downwardly through
said liquid discharge opening in said substrate member.

2. The plastic gravity flow valve of claim 1 wherein said plastic substrate member is of one-piece molded construction.

3. The plastic gravity flow valve of claim 1 wherein said valve plate, said posts, said second ring member and said third ring member are of one-piece molded construction.

4. The plastic gravity flow valve of claim 1 wherein the valve is comprised entirely of recyclable plastic.

5. The plastic gravity flow valve of claim 1 wherein said plurality of spaced-apart valve retainers permit said third ring member to pass downwardly thereby when said plastic valve member is initially inserted into said substrate member but prevent said third ring member to pass upwardly thereby during use of the valve.

6. The plastic gravity flow valve of claim 1 when said plastic substrate member is of one-piece molded construction and said valve member is of one-piece molded construction.

7. The plastic gravity flow valve of claim 1 wherein said lower and upper ends of said first semi-helical plastic spring are offset 180 degrees with respect to one another and wherein said lower and upper ends of said second semi-helical plastic spring are offset 180 degrees with respect to one another.

8. A plastic gravity flow valve for insertion into the throat of an inverted liquid container, comprising:
  a generally cylindrical and vertically disposed plastic
    substrate member including:
    (a) a lower end and an upper end;
    (b) a vertically disposed and ring-shaped wall member,
      having an inner side, an outer side, an upper end and
      a lower end, at said lower end of said substrate
      member and which defines a liquid discharge open-
      ing;
    (c) a horizontally disposed and ring-shaped first lip
      extending outwardly from said lower end of said
      wall member;
    (d) a horizontally disposed and ring-shaped second lip
      extending outwardly from said wall member above
      said first lip;
    (e) said wall member, said first lip and said second lip
      being overmolded with a plastic material;
    (f) a plurality of vertically disposed and radially
      spaced-apart elongated supports with each of said
      elongated supports having an upper end, a lower end,
      an inner side and an outer side, extending upwardly
      from said upper end of said wall member;
    (g) a first ring member, having inner and outer sides,
      secured to said upper ends of said elongated sup-
      ports; and
    (h) a plurality of radially spaced-apart valve retainers
      secured to said inner side of said first ring member;
  a plastic valve member, having upper and lower ends,
    including:
    (a) a horizontally disposed and disc-shaped valve plate
      having a periphery, an upper side and a lower side;
    (b) a horizontally disposed second ring member opera-
      tively secured to said valve plate so as to be posi-
      tioned above said valve plate;
    (c) a first semi-helical plastic spring having a lower end
      and an upper end;
    (d) said lower end of said first semi-helical plastic
      spring being secured to said second ring member;
    (e) a second semi-helical plastic spring having a lower
      end and an upper end;

(f) said lower end of said second semi-helical plastic spring being secured to said second ring member opposite to said first semi-helical plastic spring;

(g) a horizontally disposed third ring member having upper and lower sides;

(h) said upper end of said first semi-helical plastic spring being secured to said third ring member;

(i) said upper end of said second semi-helical plastic spring being secured to said third ring member opposite to said upper end of said first semi-helical plastic spring;

said plastic valve member being vertically movably positioned in said plastic substrate member;

said plastic valve member being vertically movable with respect to said plastic substrate member between lower and upper positions;

said first and second plastic springs yieldably urging said plastic valve member to its lower position;

said valve plate closing said liquid discharge opening in said substrate member when said plastic valve member is in said lower position; and said valve plate being spaced above said liquid discharge opening in said substrate member when in said upper position to permit liquid to pass downwardly through said liquid discharge opening in said substrate member.

9. The plastic gravity flow valve of claim 8 wherein said plastic substrate member is of one-piece molded construction.

10. The plastic gravity flow valve of claim 8 wherein said valve plate, said posts, said second ring member and said third ring member are of one-piece molded construction.

11. The plastic gravity flow valve of claim 8 wherein the valve is comprised entirely of recyclable plastic.

12. The plastic gravity flow valve of claim 8 wherein said plurality of spaced-apart valve retainers permit said third ring member to pass downwardly thereby when said plastic valve member is initially inserted into said substrate member but prevent said third ring member to pass upwardly thereby during use of the valve.

13. The plastic gravity flow valve of claim 8 when said plastic substrate member is of one-piece molded construction and said valve member is of one-piece molded construction.

* * * * *